No. 895,330. PATENTED AUG. 4, 1908.
A. BAUR.
MATHEMATICAL INSTRUMENT.
APPLICATION FILED MAY 22, 1907.

3 SHEETS—SHEET 1.

WITNESSES: Augustus Baur, INVENTOR
By C. A. Snow & Co.
F. T. Chapman ATTORNEYS

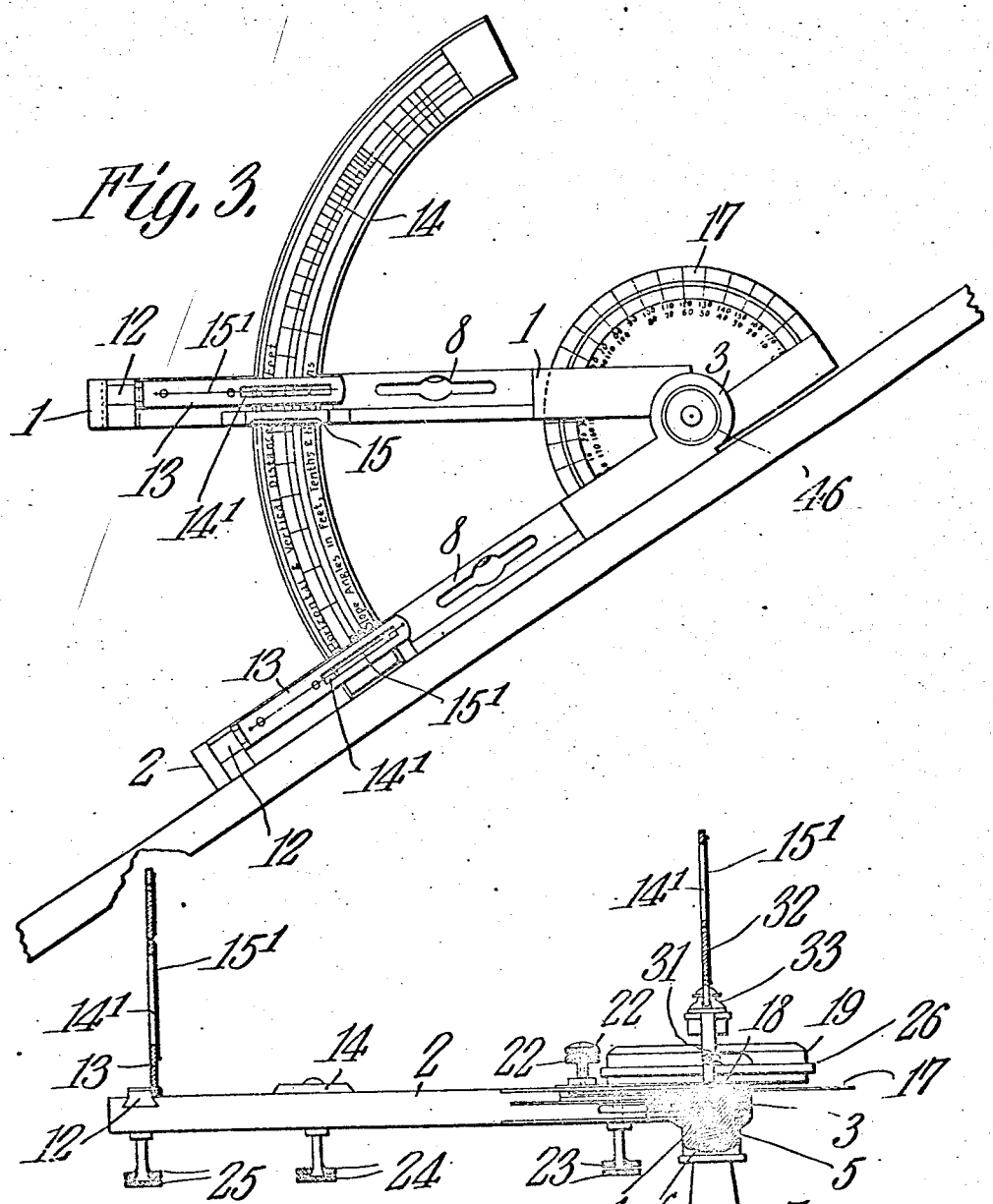

No. 895,330. PATENTED AUG. 4, 1908.
A. BAUR.
MATHEMATICAL INSTRUMENT.
APPLICATION FILED MAY 22, 1907.
3 SHEETS—SHEET 3.
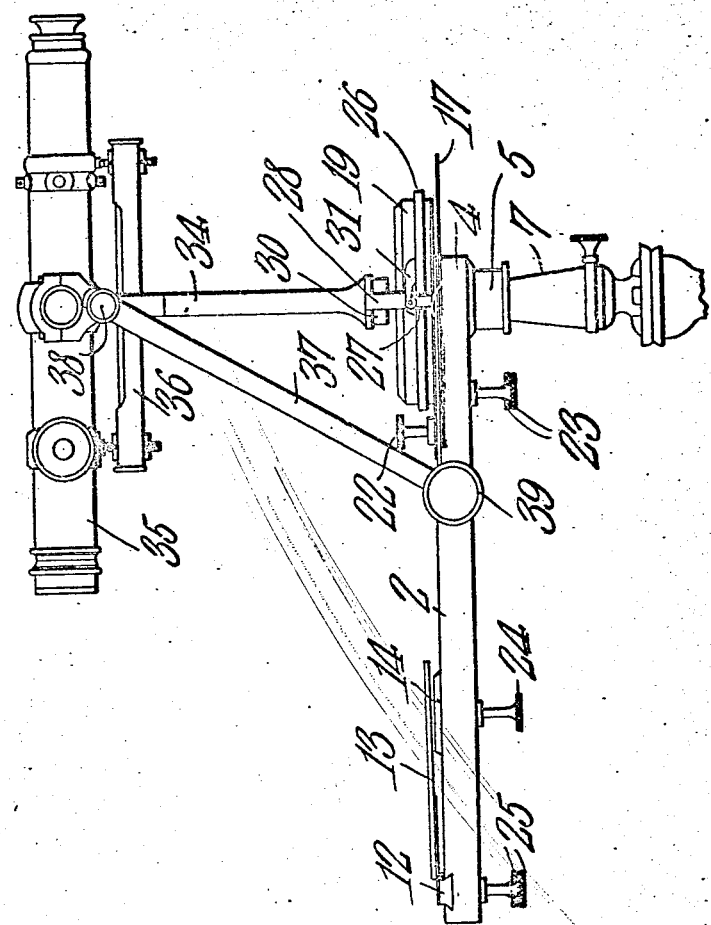
WITNESSES:
INVENTOR.
Augustus Baur,
By C. A. Snow & Co.
ATTORNEYS

UNITED STATES PATENT OFFICE.

AUGUSTUS BAUR, OF RIVER JUNCTION, FLORIDA.

MATHEMATICAL INSTRUMENT.

No. 895,330.

Specification of Letters Patent.

Patented Aug. 4, 1908.

Application filed May 22, 1907. Serial No. 375,088.

*To all whom it may concern:*

Be it known that I, AUGUSTUS BAUR, a citizen of the United States, residing at River Junction, in the county of Gadsden and State of Florida, have invented a new and useful Mathematical Instrument, of which the following is a specification.

This invention has reference to a new mathematical instrument, and its object is to produce an instrument of great accuracy especially adapted for reconnaissance and preliminary field work for both civil and military engineers.

The novel instrument is designed for a variety of uses, while at the same time it is made so compact and light that it may be easily carried in the pocket. I term the instrument a clino-trigonometer.

The novel instrument is designed, by a suitable arrangement and combination of the parts, to be used as a telemeter, a level, a surveyor's compass, a clinometer, an engineer's transit and level, and a plane table.

The novel instrument consists essentially of two arms provided with suitable levels and hinged together at one end so that the plane of the meeting edges cuts the axis of the hinge. Carried by the hinged end of the two arms is an adjustable scale covering one hundred and eighty degrees but so arranged as to be rotated through the entire three hundred and sixty degrees. In addition, the two arms are connected by a scale curved on an arc of which the axis of the hinge is the center, and this scale is so graduated as to indicate horizontal and vertical triangulation distances in feet or any other unit and slope angles in feet, tenths and hundredths or any other unit, according to the manner in which the instrument is arranged and used. Also, the arms are provided with folding sights having the usual hair-lines and movable into coincidence with the meeting edges of the arms to bring them into the plane of the pivot axis. The novel instrument also includes means for the attachment of a compass and verniers, and also a folding sight in the axis of the hinge. Moreover, provision is made for the addition of an engineer's transit telescope and spirit level.

The invention will be fully understood from the following detailed description taken in connection with the accompanying drawings forming part of this specification, in which,—

Figure 1:
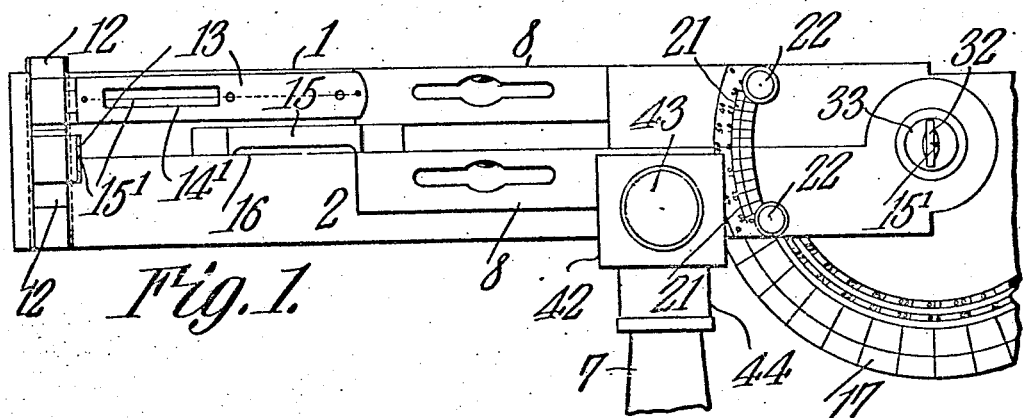
Figure 2:
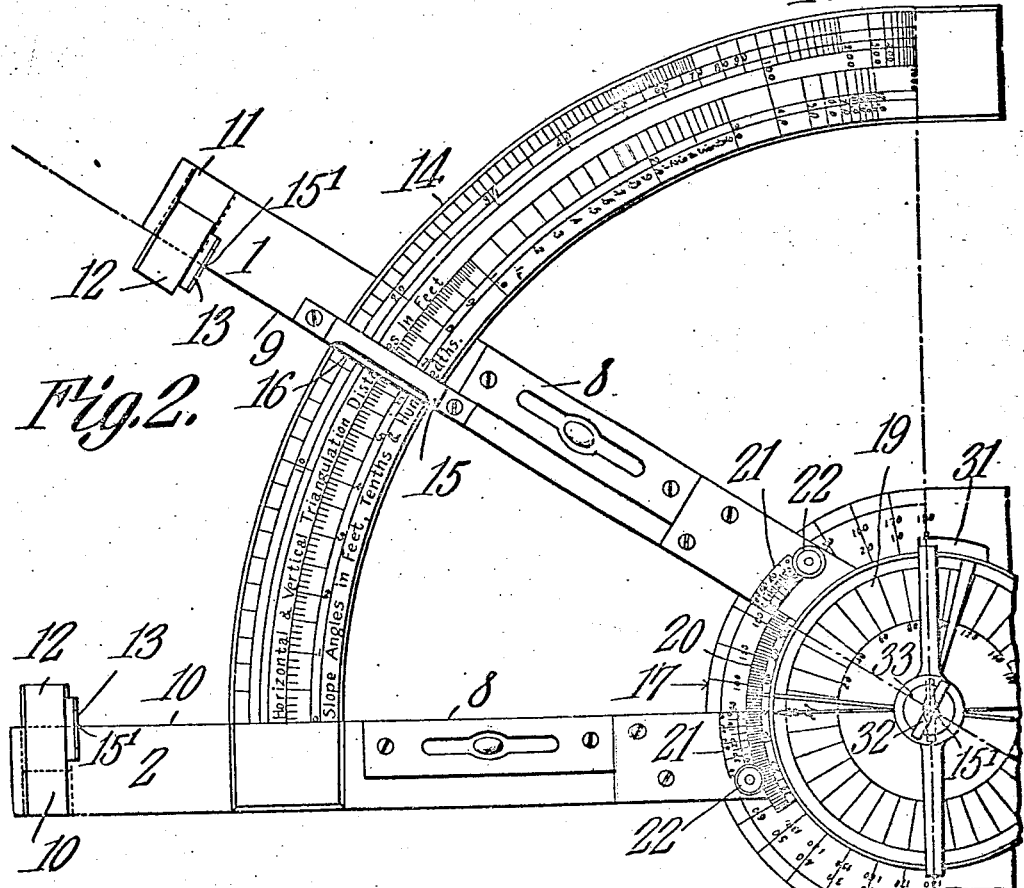

Figure 1 shows the instrument when in use as a level; Fig. 2 is a view of the instrument when used as a telemeter compass; Fig. 3 is a view of the instrument as a clinometer; Fig. 4 is a view of the instrument, with parts in section, showing the manner of using it as a surveyor's compass; Fig. 5 shows the instrument in use as a plane table; Fig. 6 illustrates the use of the instrument as a surveyor's transit and level.

The instrument consists of two arms 1 and 2 joined at one end by a hinge 3. This hinge is provided with a central stud 4 formed on one side with an enlarged head 5 and on the other side the stud 4 is upset or otherwise formed to confine the stud within the axis of the hinge. The head or enlargement 5 is formed with a nut for the reception of a screw 6 of the ordinary staff mounting 7 used for surveyor's compasses, and which need not be here described. Each arm 1 and 2 is provided with a spirit level 8 arranged, as is usual, to be visible on two meeting sides. The two arms 1 and 2 are so arranged that the meeting faces 9—10 are each in a plane cutting the axis of the hinge, and these sides constitute the working sides of the arms.

Near the outer ends of the arms are lateral undercut grooves 11 in which are seated sliding blocks 12, dovetailed to fit the undercut grooves 11, and each block has a folding sight 13 of ordinary construction with sight openings 14' and the usual hair-line 15'. Arranged to be secured to the arm 2 at a point between the outer and inner ends thereof is a graduated arc 14 passing through a guide 15 on the arm 1, which guide is provided with a knife-edge 16 coincident with the edge 9 of said arm. This arc 14 is graduated for horizontal and vertical triangulation distances in feet, and also for slope angles in feet, tenths and hundredths, but, of course, the metric system or any other desired system may be used in place of the English system of feet.

Mounted upon the pivotal axis of the arms there is a half-circle scale 17 graduated by degrees and half degrees up to one hundred and eighty degrees, although in the drawings no attempt has been made to show such fine divisions. This arc of one hundred and eighty degrees is centered on the pivot and is movable all around the pivot so that it may readily be made to read a full circle of three hundred and sixty degrees.

Constructed to be secured to the axis of the pivot by means of a threaded stem 18 entering an axial nut formed in the stem 4 is a compass 19, graduated to three hundred and sixty degrees and movable around the axis of the pivot, and, of course, also removable. There is also provided a vernier consisting of an arc 20 at the base of and outside the compass, graduated from zero to thirty degrees in degrees and half degrees on each side of the north point of the compass, and two small arcs 21—21 on each arm 1 and 2 are graduated each to sixty minutes. Suitable thumb-screws 22 are provided for the proper adjustment of the vernier arcs. Other thumb-screws 23 on the under side of the arms 1 and 2 are provided for the adjustment of the arc 17. Still other thumb-screws 24, passing through the arms 1 and 2 from below, are provided for the securing of the clinometer and telemeter arc 14 to the said arms, while other thumb-screws 25, passing upward through the arms 1 and 2, engage and clamp the slides 12 in the desired position.

Surrounding the compass box is an annular rib 26 fast thereon and provided with slots or recesses 27 at diametrically opposite points agreeing with the east and west points of the compass scale. These recesses 27 receive the legs 28 of a U-shaped frame 29 extending diametrically across and above the compass and formed with a boss 30 at its center, suitably threaded to receive certain parts to be hereinafter referred to. One leg of this frame 29 carries a dog 31 so placed as to operate the compass needle lock when the frame 29 is in place.

The frame 29 is designed to carry various parts, according to the type of instrument to be used. For instance, when the device is used as a telemeter compass or a surveyor's compass, a sight 32 provided with a screw-plug end 33 is screwed to the boss 30. This is indicated in Figs. 2 and 4. When the device is used as an engineer's transit and level the sight 32 is replaced by a frame 34 at the upper end of which are journaled the trunnions of a telescope 35 carrying the level 36 while a brace 37, fast to the frame 34 by a thumb-screw 38 at its upper end and fast to the arm 1 or 2, as the case may be, at its lower end by a thumb-screw 39, serves to maintain the frame 34 stiffly in place. The arrangement of the structure for use as an engineer's transit and level is illustrated in Fig. 6, while in Fig. 5 the same structure is shown in use as a plane table. In this case the drawing board 40 is supported upon a tripod head 41 of different structure than the head 7 before referred to, but as both the head 7 and the head 41 are of ordinary and known construction it is unnecessary to describe them in any detail.

In Fig. 1 the structure is shown folded together for use as a level. In this case a clamp 42 is held by a thumb-screw 43 to the arm 1, and this clamp is provided with a nut 44 to receive the head 7. The clamp 42 is attached to the arm 1 close to one of the levels 8.

It will be understood, of course, that the various parts of the instrument may be made of wood, preferably box-wood, and metal, or entirely of metal such as brass, bronze or aluminum.

The clino-trigonometer, as shown in Fig. 2, is all that is necessary to perform reconnaissance and preliminary survey work. But when angles at great distances, too far for ordinary vision, or when plane table work at great range, is required, then the telescope mounting, shown in Figs. 5 and 6, is used, and the standard for this telescope, whereby the same is adapted to the clino-trigonometer, is of great value. The spirit level 36, under the telescope, converts the transit into an engineer's level for greater distances than can be obtained by the unaided eye. By adjusting the telescope in perfectly horizontal position by aid of the level 36 and clamping it by means of the thumb-screw 45, the instrument is in readiness for taking levels of the surrounding country, having been converted into an engineer's level.

Now, considering the various applications of the instrument, the telemeter shown in Fig. 2 will be first considered. In the figure the instrument is viewed from above, being placed in a horizontal position upon a staff or tripod. Direct readings are taken from the arc 14. The indications on this arc are based on computations made on a base line of, say, twenty-five feet, but should a longer base line be required, the readings will simply be as many times the indicated readings as the standard base line is contained in the longer base line. Suppose, for instance, that owing to the great distance of an inaccessible point to be measured a greater base line, say, a base line of one hundred and fifty feet is necessary. The instrument is placed over the terminations of the base line and the sights on, say, the arm 2, are so placed as to cover the point from which the one hundred and fifty foot base line was measured. Then the other arm is directed upon the distant object and the reading from the arc 14 is taken. Suppose this reading is seventy-five. Then, since twenty-five is contained in one hundred and fifty six times, the distance to the far object is six times seventy-five, or four hundred and fifty feet. Suppose, however, it is desired to obtain the height of a building or steeple or mountain. The operation is exactly the same as before except that the instrument is placed so that the arm 1 may move through a vertical plane, which may be done by means of the clamp 42. Having ascertained the distance from the instrument to the base of the object whose altitude is desired, either by actual measurement or by the method just described for horizontal distances, and leveling the instrument by means of the levels 8, then on moving the arm 1 until the sights cover the summit of the object, the reading may be taken from the arc 14, and, if necessary, multiplied by the number of times twenty-five is contained in the length of the base line, but to the height thus obtained must be added the height of the instrument from the ground.

The instrument is readily converted into a level by removing the compass and screwing the sight 32 into the pivot center in place of the compass. Then by using the sight 32 and the sight 13 on the arm 2, moved so as to be in the plane of the edge 10 of said arm, and securing the instrument to the staff or tripod by the clamp 42, all as shown in Fig. 1, and properly leveling the instrument by means of the spirit levels 8, the instrument is in condition for use as a level. Now, by placing the level in a horizontal position and replacing the compass with the frame 29 and securing the sight 32 therein, the instrument becomes converted into an engineer's compass, as shown in Fig. 4, and to which reference has already been made.

Coming, now, to the clinometer alone, as illustrated in Fig. 3, the compass is removed and the thumb-screw 46 is screwed into place. The sights are folded down out of the way and the arc 17 is turned up as shown. The slope angles are then read in feet, tenths and hundredths of a foot for every foot in horizontal distance, directly from the scale on the arc 14.

The manner in which the instrument may be transformed into an engineer's transit and level and a plane table have already been set forth. By means of the vernier the magnetic variations as well as angles may be read to degrees and minutes, thus insuring precise and accurate work when such is desired.

It will be observed that the two arms 1 and 2 are hinged together and carry the sights, which may be folded down into contact with said arms. The frame 29 and sight 32 are readily removable from the compass 19, and the arc 14 is also readily removable from the arms 1 and 2. This permits the instrument to be packed into a very small compass and to be contained in a case small enough to readily go into the pocket.

1. An instrument of the class described, comprising two arms hinged together at one end, an index arc removably secured to one of the arms concentric with the axis of the hinge and over which the other arm is movable about the hinge, and a half-circle index plate secured to said hinge with its axis coincident with the axis of the hinge, said index plate being movable around the hinge independent of both arms.

2. In an instrument of the class described, two arms hinged together at one end, an index arc secured to one of the arms concentric with the axis of the hinge and with relation to which the other arm is movable about the hinge, sights one at the free end of each arm and movable laterally with relation thereto and a sighting means adapted to be attached to the instrument at the hinge in the axis of the latter.

3. An instrument of the class described comprising two arms hinged together at one end, levels secured to said arms, an index arc removably secured to one of the arms concentric to the axis of the hinge and with relation to which arc the other arm is movable about the hinge, a semi-circular index plate secured to the hinge end of the arms and movable around the axis of said hinge, and sights one at the axis of the hinge and others carried by the free ends of the arms and movable laterally with relation thereto to bring their operative points coincident with the plane of the meeting edges of the arms.

4. An instrument of the class described comprising two arms hinged at one end, a pivot stud for the hinge projecting beyond one side thereof and provided with a nut and also provided with a nut within the pivot in the axis thereof, a compass provided with a center screw adapted to the nut in the axis of the pivot, a diametric frame straddling and held by said compass and provided with a nut coincident with the axis of the hinge, sighting means at the end of the hinged arms and other sighting means provided with a screw adapted to the nut in the frame.

5. An instrument of the class described, comprising two arms hinged together at one end and having their contiguous edges constituting the reading or working edges, a pivot stud for the hinge projecting beyond one face thereof and there provided with a nut and also provided with a nut within the hinge in the axis thereof, a compass provided with a center screw adapted to the nut in the axis of the hinge, a diametric frame straddling the compass and held thereby, said frame being provided with a nut in the axial line of the hinge and also provided with a member adapted to engage the compass needle lock when the frame is in position on the compass, sighting means at the ends of the hinged arms, and other sighting means provided with a screw adapted to the nut in the frame.

6. In an instrument of the class described, two arms hinged together at one end, a semi-circular index plate carried by said hinged end of the arms and movable around the same concentric with the axis of the hinge, a vernier arc concentric with and close to the axis of the hinge, other vernier arcs coacting with the first-named vernier arc and carried by each arm, and a compass removably secured to the axis of the hinge.

7. In an instrument of the class described, two arms hinged together at one end, a nut formed in the axis of said hinge, a compass secured to said hinge concentric therewith, a semi-circular index plate secured to the hinge and movable about the axis thereof, vernier arcs, one secured in fixed relation to the compass and others carried each upon one of the arms in operative relation to the fixed arc, levels carried by the arms, an index arc removably secured to one of the arms and movable with relation to the other arm, and sights one at the axis of the hinge and others mounted near the outer ends of the arms and movable laterally with relation thereto.

In testimony that I claim the foregoing as my own, I have hereto affixed my signature in the presence of two witnesses.

AUGUSTUS BAUR.

Witnesses:
  M. MORGAN,
  D. H. MORGAN.